United States Patent [19]

Daniels

[11] Patent Number: 5,563,461
[45] Date of Patent: Oct. 8, 1996

[54] MOTOR FAN BAFFLE

[75] Inventor: Nicholas R. Daniels, St. Louis County, Mo.

[73] Assignee: Emerson Electric Co., St. Louis, Mo.

[21] Appl. No.: 258,242

[22] Filed: Jun. 10, 1994

[51] Int. Cl.⁶ .............................. H02K 11/00; H02K 9/06
[52] U.S. Cl. ................... 310/71; 310/58; 310/62; 310/63
[58] Field of Search ............................ 310/62, 63, 60 R, 310/58, 59, 71

[56] References Cited

U.S. PATENT DOCUMENTS

| | | | |
|---|---|---|---|
| 2,068,820 | 1/1937 | Sarazin et al. | 310/62 |
| 2,670,686 | 3/1954 | Bergh | 310/71 |
| 2,776,385 | 1/1957 | Modrey | 310/71 |
| 3,251,085 | 5/1966 | Jacobs | 310/62 |
| 3,271,601 | 9/1966 | Raver | 310/58 |
| 3,293,463 | 12/1966 | Church | 310/71 |
| 3,643,119 | 2/1972 | Lukens | 310/62 |
| 3,748,509 | 7/1973 | Karcher | 310/62 |
| 4,038,574 | 7/1977 | Crow et al. | 310/71 |
| 4,128,735 | 12/1978 | Zehren | 310/71 |
| 4,204,810 | 5/1980 | Vogel | 310/194 |
| 4,658,164 | 4/1987 | Gotoh | 310/71 |
| 4,741,677 | 5/1988 | Frigo | 310/63 |
| 4,781,726 | 11/1988 | Fisher et al. | 310/71 |
| 4,918,343 | 4/1990 | Heinrich et al. | 310/58 |
| 5,040,950 | 8/1991 | Dalquist, III et al. | 417/234 |
| 5,086,243 | 2/1992 | Hofmann | 310/68 B |
| 5,095,235 | 3/1992 | Kitamura | 310/62 |
| 5,114,317 | 5/1992 | Cohen | 310/62 |
| 5,189,327 | 2/1993 | Ootsuka et al. | 310/71 |
| 5,343,101 | 8/1994 | Matani | 310/58 |

FOREIGN PATENT DOCUMENTS

| | | | |
|---|---|---|---|
| 1212623 | 3/1966 | Germany | 310/63 |
| 3230736 | 10/1991 | Japan . | |

Primary Examiner—Clayton E. LaBalle
Attorney, Agent, or Firm—Polster, Lieder, Woodruff & Lucchesi

[57] ABSTRACT

A baffle and lead guide is provided for an electric motor with a reverse air flow cooling system for the motor. The motor includes a shell housing a stator assembly and a rotor assembly, the rotor assembly including an axially extending shaft. A first end shield closes one end of the shell and a second end shield closes the second end. The shaft is rotatably journaled in at least one of the first and second end shields and extends through at least one of the first and second end shields. A fan is fixed to the shaft between the rotor and the second end shield to rotate with said shaft. Leads extend to the second end shield through the motor shell from the stator assembly. The baffle is positioned axially adjacent the fan. Preferably, the baffle is annular in shape and includes at least one axially extending leg which defines a lead chute radially outboard of the fan to guide the lead wires past the fan.

23 Claims, 3 Drawing Sheets

MOTOR FAN BAFFLE

BACKGROUND OF THE APPLICATION

This application relates to dynamoelectric machines, and, in particular, to a baffle or lead guide for an electric motor having a fan secured in the lead end of the motor.

Dynamoelectric machines, including electric motors, often include a fan within the motor housing. The fan directs air flow through the motor housing to cool the motor components. In the past, the fan has generally been mounted at the shaft end of the motor to push air through the housing towards the lead end of the motor. It has recently been found that greater cooling can be obtained if the fan is mounted at the lead end of the motor and pulls, rather than pushes, air through the motor. However, with the fan at the lead end of the motor, the leads may interfere with, or become entangled in, the fan.

Devices for controlling the position of lead wires in motors are known in the art. For example, a lead wire guide is shown in U.S. Pat. No. 4,038,574. The lead wire guide described therein is integrally incorporated in the motor's terminal board and switch assembly. However, the present invention deals with controlling the lead wire position within the motor shell itself, and in particular, with lead wire routing in connection with an associated internal fan employed for cooling the motor during operational use.

SUMMARY OF THE INVENTION

One object of the invention is to provide a reverse air flow electric motor, having a fan mounted at the lead end of the motor.

Another object is to provide a baffle or lead guide for the motor lead wires which will prevent the motor leads from becoming entangled in the motor's fan.

Another object is to provide such a baffle which is easy to install in the motor's shell.

Another object is to provide such a baffle which is simple and economical to produce.

These and other objects will become apparent to those skilled in the art in light of the following disclosure and accompanying drawings.

In accordance with the invention, generally stated, a baffle and lead guide is provided for a reverse air flow electric motor. The motor includes a shell housing a stator assembly and a rotor assembly, the rotor assembly including an axially extending shaft. A first end shield closes one end of the shell and a second end shield closes the other end. The shaft is rotatably journaled in at least one of the first and second end shields, and extends through at least one of the other of the first end shields. A fan is fixed to the shaft between the rotor and the second end shield to rotate with said shaft. As is known, the fan draws air through the motor to cool the motor components. Leads extend though the second end shield into the motor shell and are electrically connected to the stator assembly. The baffle is positioned axially adjacent the fan and guides the lead wires past the fan to prevent the lead wires from becoming entangled in the fan.

The baffle is generally annular in shape, defining a ring having an inner diameter at least slightly larger than the diameter of the fan. The ring has at least one axially extending leg which defines a channel through which the leads extend. The leg is positioned radially outwardly of the fan and extends axially outwardly of the ring. The leg cooperates with the inner surface of the shell to define the channel through which the leads extend. The leg extends from the ring a distance at least equal to the axial width of the fan, enabling the leg to guide the leads past the fan.

The through bolts which hold the end shields in place pass through the ring to rotationally fix the baffle within the motor shell. Openings are formed in the ring for through bolt passage. Preferably, the openings are bound by an outer wall which is flush with the outer edge of the ring and radially extending side walls.

The baffle is press fit and frictionally positioned axially in the shell. The baffle includes radially extending ribs which have an outer edge flush with the outer edge of the baffle. The ribs, as well as the through bolt opening outer walls provide friction points which frictionally engage the inner surface of the motor shell.

DESCRIPTION OF THE PREFERRED EMBODIMENT

Figure 1:
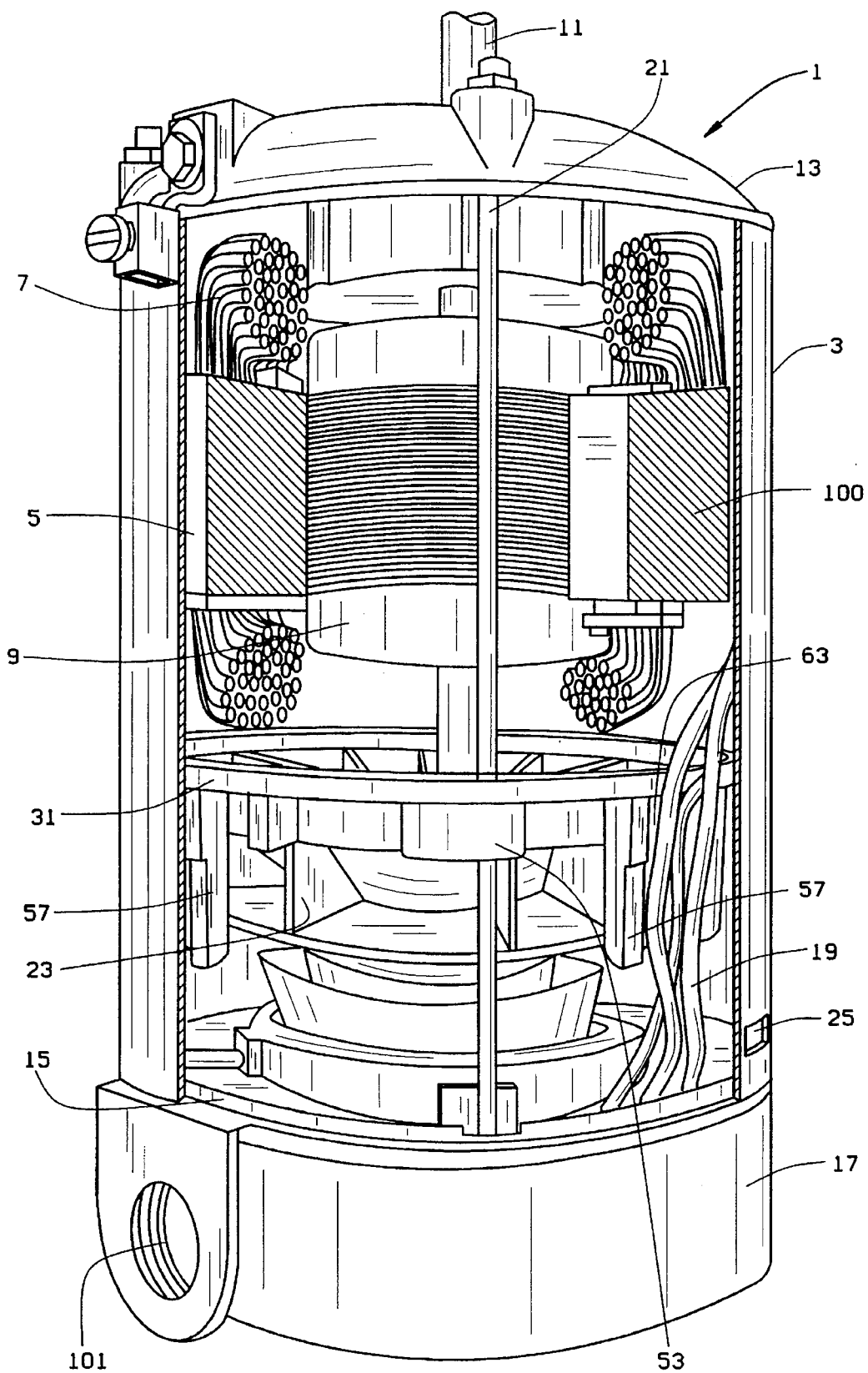
FIG. 1 is a view in side elevation, partially in cross section and cut away, of an illustrative embodiment of an electric motor of the present invention.
Figure 2:
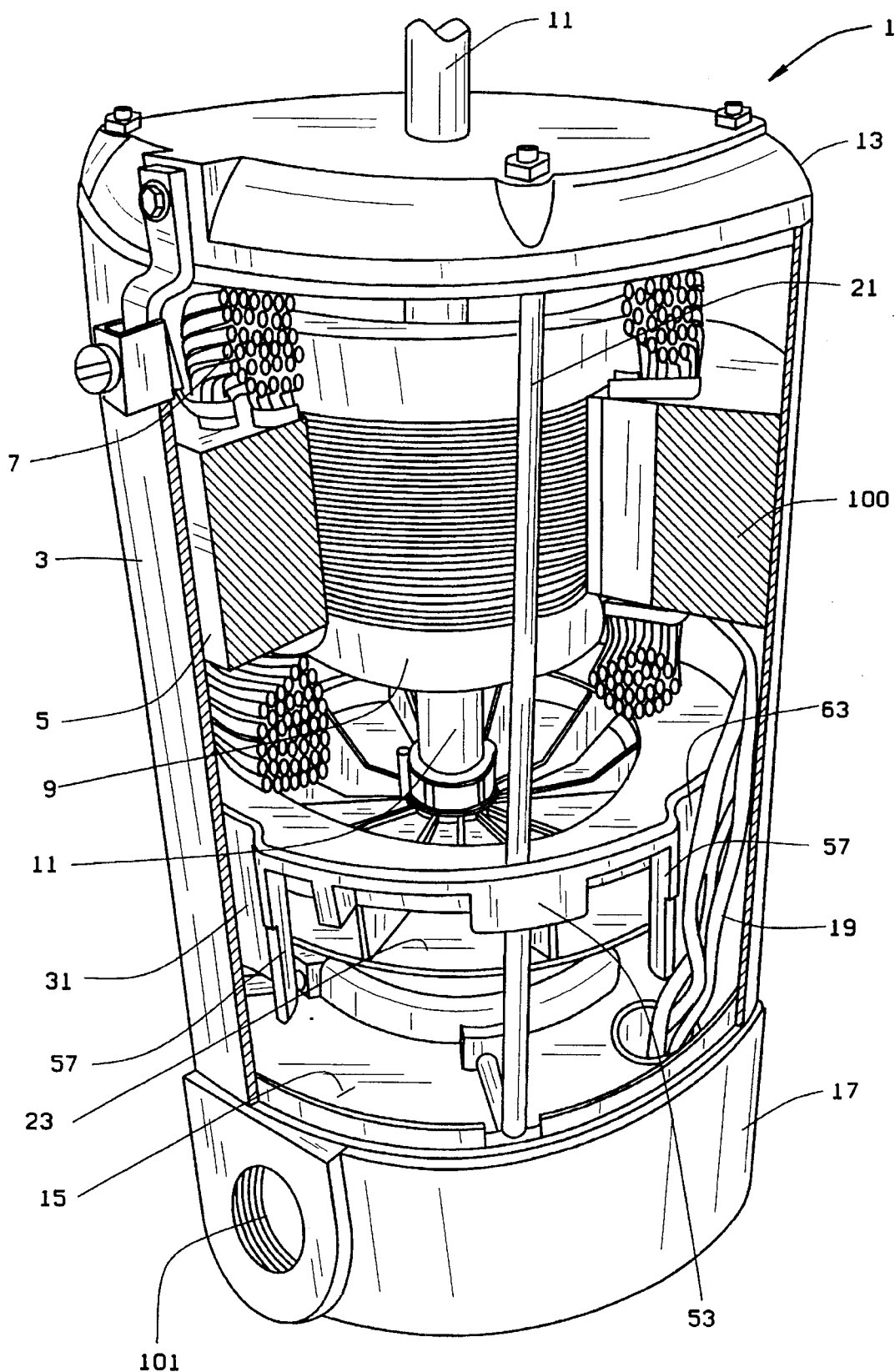
FIG. 2 is a perspective view, partially in cross section and partially cut away, of the electric motor shown in FIG. 1.

An illustrative embodiment of an electric motor 1 of the present invention is shown generally in FIGS. 1 and 2. Motor 1 includes a shell 3 housing a stator assembly 5. The stator assembly 5 includes a laminated core 100 formed from a plurality of individual laminations which define discs, an axial bore, and a plurality of radially extending slots opening to the core. The slots receive windings 7. A rotor assembly 9 is rotatably mounted within the bore. The rotor assembly has an axially extending shaft 11 for rotatably supporting the rotor within the stator, as is known.

A first end shield 13 closes one end of shell 3. One end of rotor shaft 11 is journaled in, and extends through, end shield 13. End shield 13 is thus commonly known as the shaft end of the motor, having a single shaft extension. A second end shield 15 closes the other end of the shell 3. The two end shields 13 and 15 and the shell 3 cooperate to define an enclosure. Shaft 11 is also journaled for rotation in this end shield, but often does not extend through the end shield 15. An end cap 17 is mounted on the outer surface of end shield 15 and, as is known, encloses motor control circuitry (not shown). An opening 101 is provided in the end cap 17 to connect the motor control circuitry to a source of suitable electrical energy. Motor leads 19 extend from the stator assembly 5 to the circuitry through the end shield 15, for electrically connecting the stator windings 7 to the source of electrical energy. Because the leads are attached to the stator assembly 5 along the end shield 15 side of the motor, the end shield 15 side is said to be the lead end of the motor. Through bolts 21 extend from the first end shield 13 through the shell to the second end shield 15 to secure the end shields on shell 3.

To promote cooling of the motor components, a fan 23 is placed within housing 3. Fan 23 is mounted to shaft 11 to rotate with the shaft. As will be appreciated by those skilled in the art, fan 23 may assume a variety of configurations and, in and of itself, forms no part of the present invention. Preferably, the fan is mounted between the rotor 9 and the second end shield 15 in the lead end of the motor 1. Air vents are formed in the first end shield 13, or in the shell 3 near end shield 13, or both. Air outlet openings 25 are formed in the shell 3 near the second end shield 15. In operation, the fan pulls air through the end shield and/or shell, over the stator and rotor, and out the openings 25. Motor 1 is thus denoted a reverse air flow motor.

Figure 3:
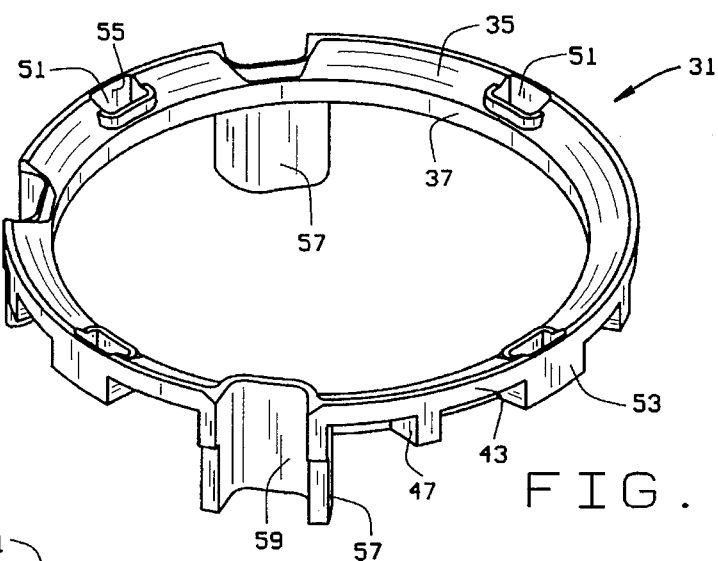
FIG. 3 is a perspective view of a baffle of the present invention utilized in the electric motor to guide the lead wires past the motor's fan.

A baffle and lead guide 31 (FIGS. 3–5) is mounted in the shell 3 and operates to prevent the leads 19 from becoming entangled in the fan. Baffle 31 is preferably generally annular in shape, defining a ring 33. Ring 33 has an upper surface 35 which is sloped generally downwardly (as shown in the FIGS.) and radially inwardly. A generally axial surface 37 extends from the radial inner edge of surface 35 and defines a radially inner extension for baffle 31. A bottom surface 39 is defined by the material thickness of ring 33, beneath upper surface 35. The ring 33 geometry is such as to include a generally horizontal portion 41 extending inwardly from a radially outer edge 43 of the baffle and a beveled portion 45 extending from the horizontal portion 41 to the axial surface 37.

Preferably, the baffle is press fit in the shell and held in its axial position by friction. A plurality of ribs 47 extend radially along the bottom surface 39 and axially from surface 35 in the mounted position of the baffle 31. The radially outer surfaces of ribs 47 are substantially flush with the radially outer edge 43 of baffle 31. Ribs 47 are provided to give width to the ring 33. The added width gives more axial surface area to contact the inner surface of the shell to provide a better press fit of the baffle in the shell 3. The ring could be formed as a thick ring (i.e. to have the same axial width as the ribs give the ring). However, because of the inability to form perfect circles, if a thick ring was used, the baffle may only contact the inner surface of the shell at a few points. This may allow the baffle to slip within the shell. The ribs, on the other hand, provide a high, localized pressure, which creates a tight fit between the baffle and the shell to better secure the baffle axially in the shell. The use of ribs also reduces the amount of material needed to make the baffle 31.

To prevent the ring from rotating in the shell, the through bolts 21 extend through ring 33. Holes 51 are formed in the ring, one hole for each through bolt 21. The holes 51 are sized so that the bolts may be easily slid through the holes. Preferably, the holes 51 are defined on one side by baffle radially inner surface 37, and on an opposite, outer side, by a wall 53 which depends from ring bottom surface 39. Wall 53 is flush with the outer edge 43 of the ring. Side walls 55 define the remaining surfaces of the holes 51. The holes 51 thus have a width which is slightly smaller than the annular width of the ring. The outer wall 53 and side walls 55 depend axially from the ring bottom surface 39 so that the bottoms of walls 53 and 55 are flush with the bottom of the baffle's radially inner wall 37. The wall 53 adds further surface area which will contact the inner surface of the motor shell to hold the baffle in the shell. Preferably, the ribs 47 and hole side walls 55 are substantially evenly spaced about the ring 33.

Legs 57 extend axially from ring 33. Legs 57 are generally arcuate in cross-section. The legs are defined by a radially outer surface 59 which opens to one side to a mouth 61 in ring 33. Surface 59 and mouth 61 define an open-type channel 80. The outer edges of legs 57 are flush with the baffle's radially outer edge 43. The edges of the legs can thus also serve as pressure points which contact the inner surface of the motor shell to frictionally hold the baffle 31 in the shell. When baffle 31 is inserted in shell 3, the channel 80 and the inner surface of the shell 3 cooperate to define a lead guide 63, through which leads 19 extend. As seen in the FIGS. 1 and 2, ring 33 has an outer diameter larger than the diameter of the fan so that the legs 57 will be positioned radially outside of the fan. The legs extend from the ring a distance sufficient to guide the lead wires past the fan. Thus, the lead guide 63 extends from ring 33 a distance at least equal to the axial width of the fan. This length will enable the lead guide to guide the wires past the fan to prevent the wires from becoming entangled in the fan. Preferably, the baffle 31 is positioned between the fan and the rotor. The baffle, could, however, be positioned between the fan and the second end shield, if desired.

Although only one leg 57 is required, baffle 31 preferably is constructed so as to include a plurality of legs. The drawings show baffle 31 to have three legs 57. More or fewer legs can be provided. This allows for the baffle to be positioned in different rotational positions, so that a lead guide will be positioned to allow for easy insertion of the leads 19 through the lead guide, no matter the orientation of the baffle with respect to the stator assembly 5.

Figure 4:
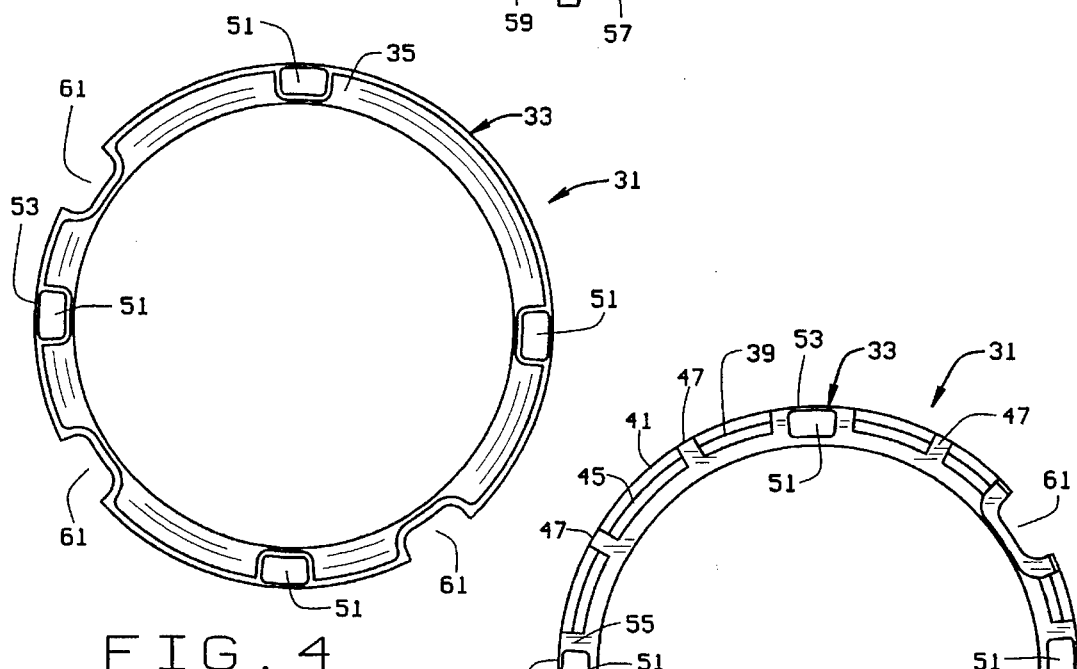
FIG. 4 is a top plan view of the baffle.
Figure 5:
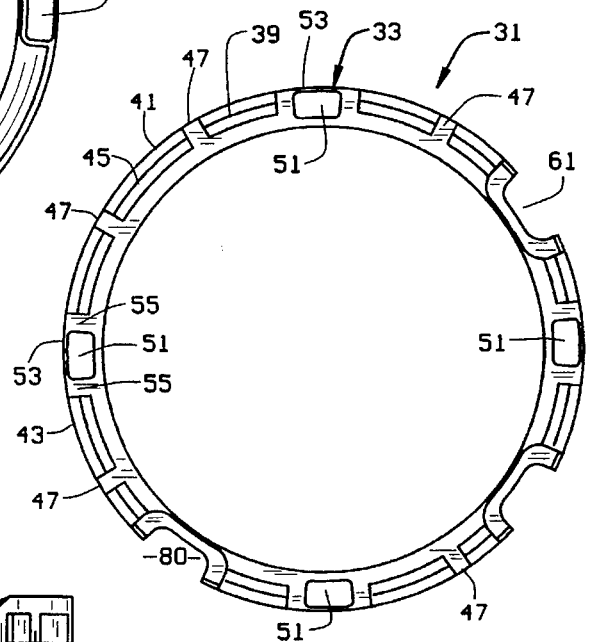
FIG. 5 is a bottom plan view of the baffle.
Figure 6:
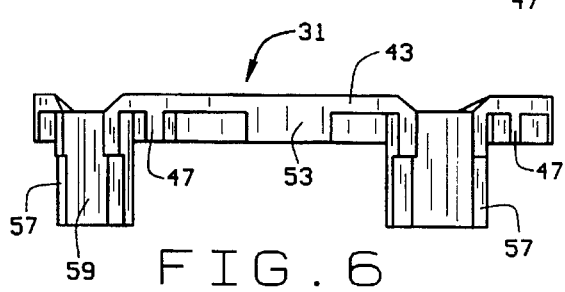
FIG. 6 is a side elevational view of the baffle.

As can be appreciated, the baffle 31 operates to locate the leads 19 out of the way of the motor fan 23. Preferably, baffle 31 is formed of a plastic, so that it may be easily molded. It may, however, be formed from other materials, such as metals. Because the baffle is annular, it has a narrow profile, in plan, as can be seen in FIGS. 4 and 5. The inner diameter of the baffle 31 is slightly larger than the outer diameter of the fan. Baffle 31 thus does not interfere with the flow of air through the motor 1 and does not interfere with the cooling operation of the fan.

Variations within the scope of the appended claims may be apparent to those skilled in the an upon review of the foregoing disclosure and accompanying drawings. For example, the bolts 21 could be completely threaded, and the baffle could threadably receive the bolts 21, or nuts could be positioned on the bolts, upon which baffle 31 would rest. Rather than having legs 57 define a lead guide with the inner surface of the motor shell, the legs could comprise hollow tubes through which the leads 19 extend, for example. Similar variations will occur to those skilled in the art in view of the preceding description. Other methods for positioning the baffle could be used. For example, one or more finger like indentations could be formed in the shell to define a baffle locator. These examples are merely illustrative.

I claim:

1. A dynamoelectric machine having a shell housing a stator and a rotor, a first end shield closing one end of said shell, a second end shield closing a second end of said shell, a shaft extending axially from said rotor and being journaled for rotation in said second end shield and rotatably extending through said first end shield, a fan fixed to said shaft between said rotor and said second end shield to rotate with said shaft, leads extending through said second end shield which are electrically connected to said stator and a baffle mounted in said shell; said baffle defining a channel with said shell through which said leads pass to guide said leads past said fan.

2. The dynamoelectric machine of claim 1 wherein said baffle comprises a generally annular ring having at least one axially extending leg positioned radially outwardly of said fan, said leg defining said channel.

3. The dynamoelectric machine of claim 2 wherein said leg extends from said ring a distance at least equal to the axial width of said fan.

4. The dynamoelectric machine of claim 3 wherein said leg defines a radially outwardly opening groove; radially outer edges of said legs cooperating with an inner surface of said shell to define said channel with said groove.

5. The dynamoelectric machine of claim 4 wherein said leg is generally arcuate and concave.

6. The dynamoelectric machine of claim 3 including through bolts extending between said first and second end shield to hold said end shields to said shell; said through bolts passing through said baffle to rotationally fix said baffle in said shell.

7. The dynamoelectric machine of claim 6 wherein said baffle is frictionally held in said shell against axial movement.

8. The dynamoelectric machine of claim 7 wherein said baffle has a plurality of radially extending ribs depending from a surface of said baffle, said ribs having a radially outer edge substantially flush with a radially outer edge of said baffle.

9. The dynamoelectric machine of claim 8 wherein said baffle includes openings in said ring through which said through bolts extend, said openings being bounded by a radially outer wall which is flush said baffle outer edge and which has an axial width substantially equal to the axial width of said ribs, said ribs and said opening outer wall having bottom surfaces which are substantially coplanar.

10. A baffle for use in an electric motor, the motor having a shaft end and a lead end, a fan being placed along said motor lead end, and leads exiting said motor from said lead end, said baffle positioning said leads radially from said fan to prevent said leads from contacting aid fan; said baffle comprising a structure which surrounds said fan in said motor, and which has at least one lead chute through which said leads extend, said chute being positioned radially outwardly of said fan and extending a distance sufficient to guide said leads past said fan.

11. The baffle of claim 10 including at least one leg, said leg defining said lead chute.

12. The baffle of claim 11 wherein said leg is generally arcuate, said leg opening radially outwardly.

13. A baffle for use in an electric motor, the motor having a shaft end and a lead end, a fan being placed along said motor lead end, and leads exiting said motor from said lead end, said baffle positioning said leads from said fan to prevent said leads from contacting said fan; said baffle comprising a structure having at least one lead chute through which said leads extend, said chute being positioned radially outwardly of said fan and extending a distance sufficient to guide said leads past said fan; said at least one chute comprising at least one leg, said at least one leg being generally arcuate and opening radially outwardly, said baffle further including a plurality of radially extending ribs depending from a surface of said baffle, said ribs having a radially outer edge substantially flush with a radially outer edge of said baffle.

14. The baffle of claim 13 wherein said structure is generally ring like and includes openings in said ring through which through bolts extend, said openings being bounded by a radially outer wall which is flush said baffle outer edge and which has an axial width substantially equal to the axial width of said ribs, said ribs and said opening outer wall having bottom surfaces which are substantially coplanar.

15. The baffle of claim 14 including radially extending walls which bound radially extending sides of said baffle openings, said radially extending walls having an axial length substantially equal to said opening outer walls.

16. The baffle of claim 15 including a radially inner wall, said wall extending axially from a surface of said baffle, said ribs and said opening side walls extending radially from said radially inner wall.

17. A baffle for use in an electric motor, the motor having a shell housing a stator assembly, a rotor assembly including a rotor shaft extending axially from said rotor, a first end shield through which said shaft rotatably extends, a second end shield in which said rotor shaft is rotatably journaled, a fan mounted on said shaft between said rotor and said second end shield, and leads exiting said motor proximate said second end shield, said leads being electrically connected to said stator assembly, said baffle being positioned adjacent said fan and defining an annular ring having a lead chute which guides said leads axially past said fan.

18. The baffle of claim 17 wherein said ring has an outer diameter greater than the diameter of said fan and at least one leg extending axially from said ring radially outwardly of said fan, said leg defining said chute.

19. The baffle of claim 18 wherein said leg is generally arcuate, said leg opening radially outwardly.

20. The baffle of claim 19 including a radially extending surface, a radially inner wall depending from said radially inner surface, and a plurality of ribs extending radially from said radially inner surface.

21. In a dynamoelectric machine including a shell, a stator mounted in said shell, a pair of end shields, respective ones of said end shield pair being positioned at opposing ends of said shell to define an enclosure, a rotor assembly including a shaft journaled for rotation along at least one of the end shields of said end shield pair, a fan mounted to said shaft for rotation therewith, and leads extending through said enclosure for electrically connecting said stator to a source of electrical energy, the improvement comprising a baffle mounted in said shell, said baffle defining a channel for guiding said leads past said fan.

22. The improvement of claim 21 wherein said baffle defines a channel with said shell.

23. The improvement of claim 22 wherein said baffle has an annular silhouette, further including a leg opening outwardly of said baffle, said leg being positioned outwardly of said fan.

* * * * *